Feb. 16, 1965    D. CORNISH    3,169,769
MULTI-DIMENSIONAL GAMEBOARD WITH CHANCE DEVICES
Original Filed April 9, 1947    4 Sheets-Sheet 1
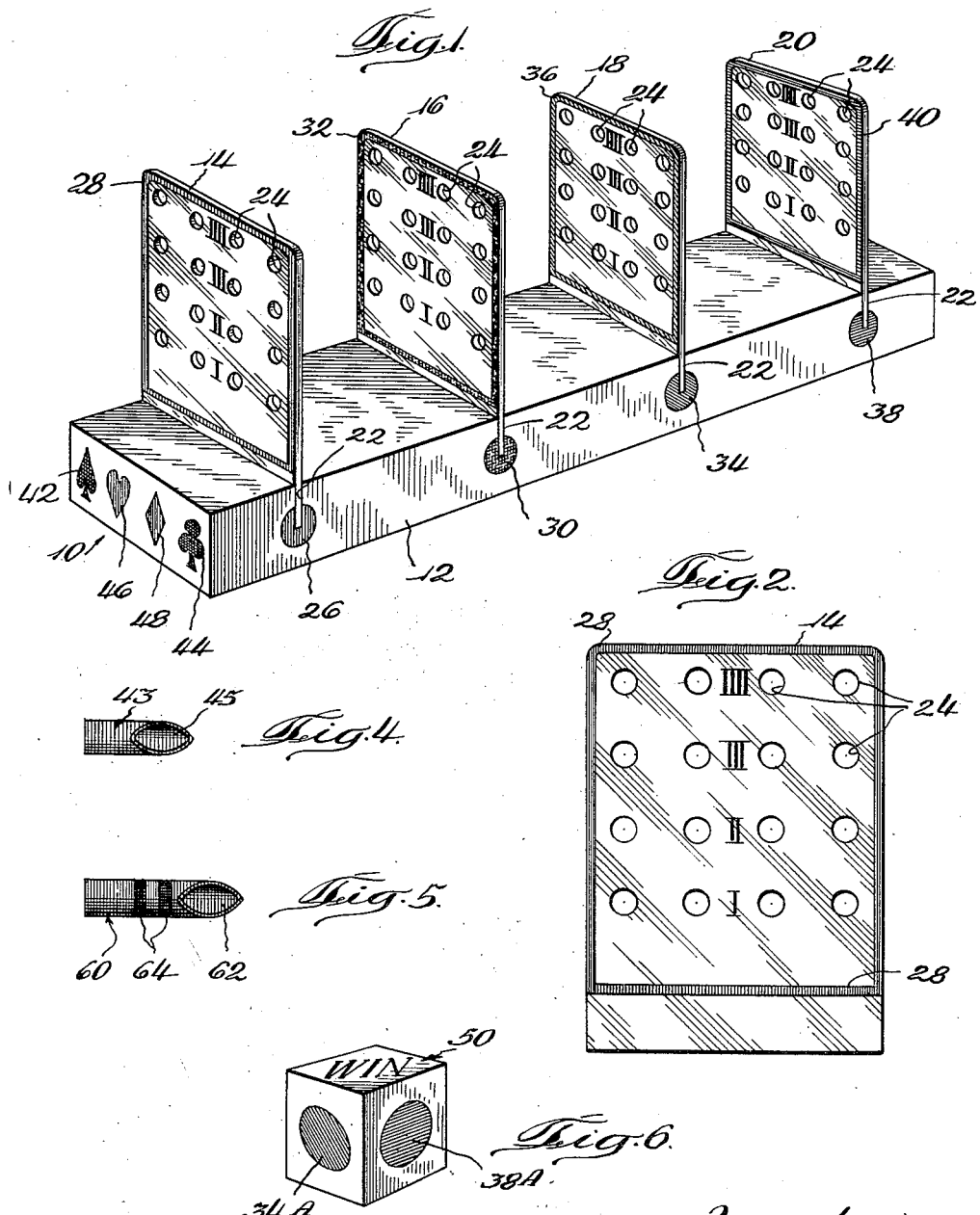

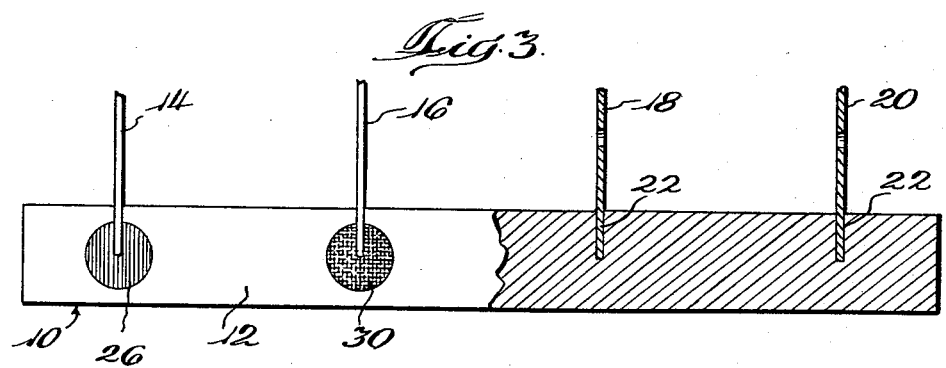
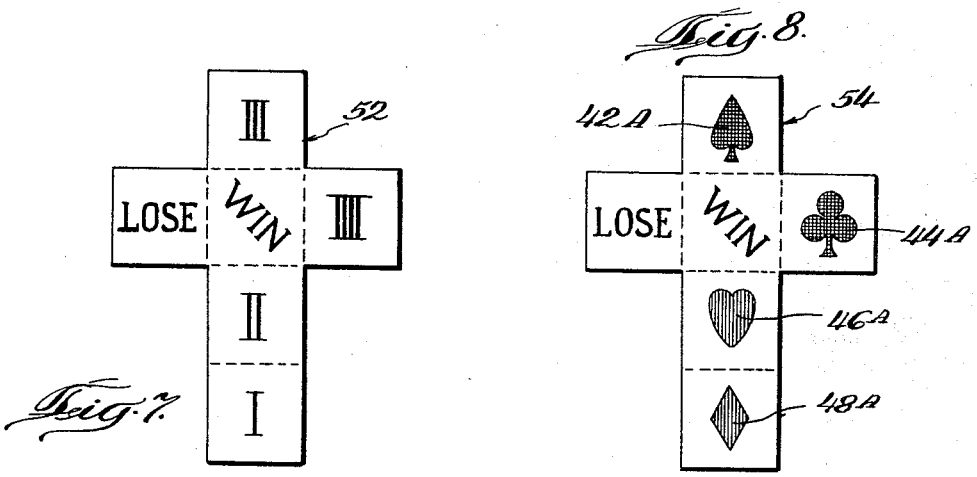
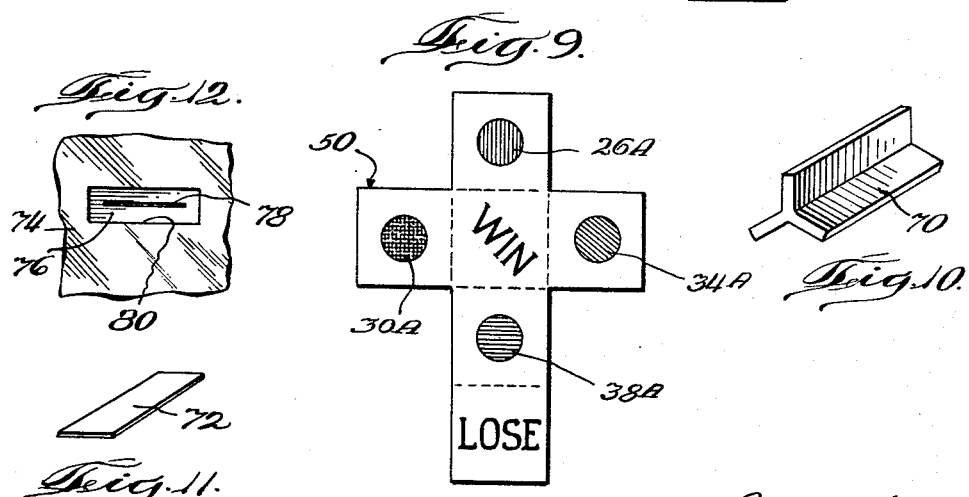

Feb. 16, 1965   D. CORNISH   3,169,769
MULTI-DIMENSIONAL GAMEBOARD WITH CHANCE DEVICES
Original Filed April 9, 1947   4 Sheets-Sheet 3
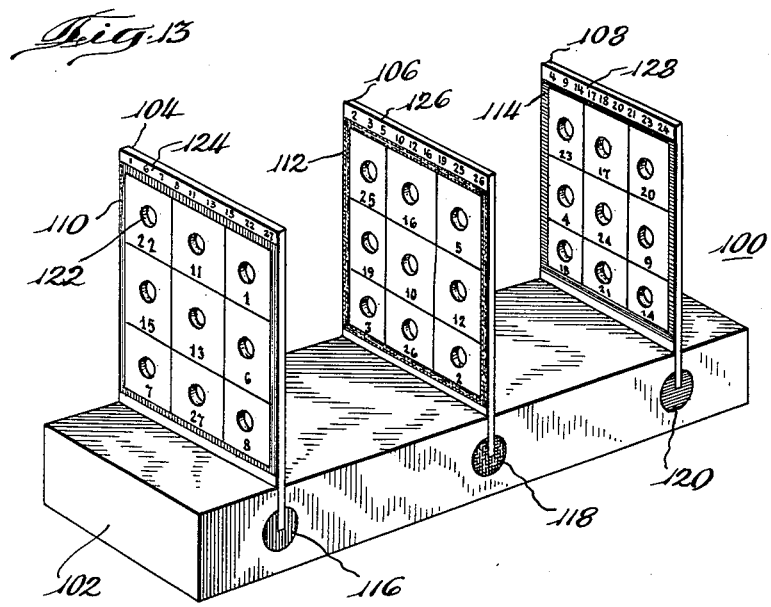
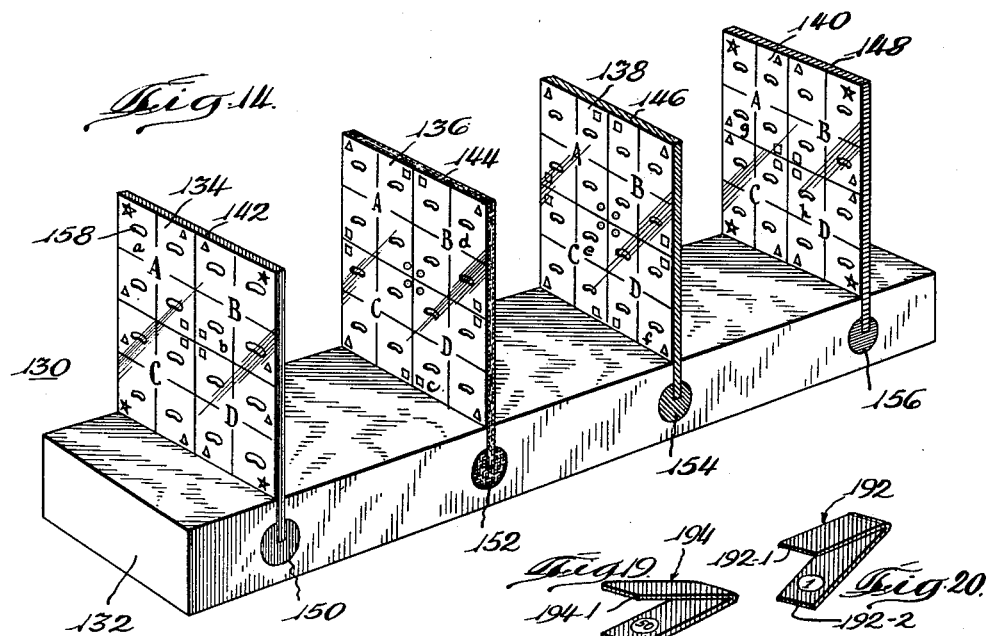

Feb. 16, 1965 D. CORNISH 3,169,769
MULTI-DIMENSIONAL GAMEBOARD WITH CHANCE DEVICES
Original Filed April 9, 1947 4 Sheets-Sheet 4
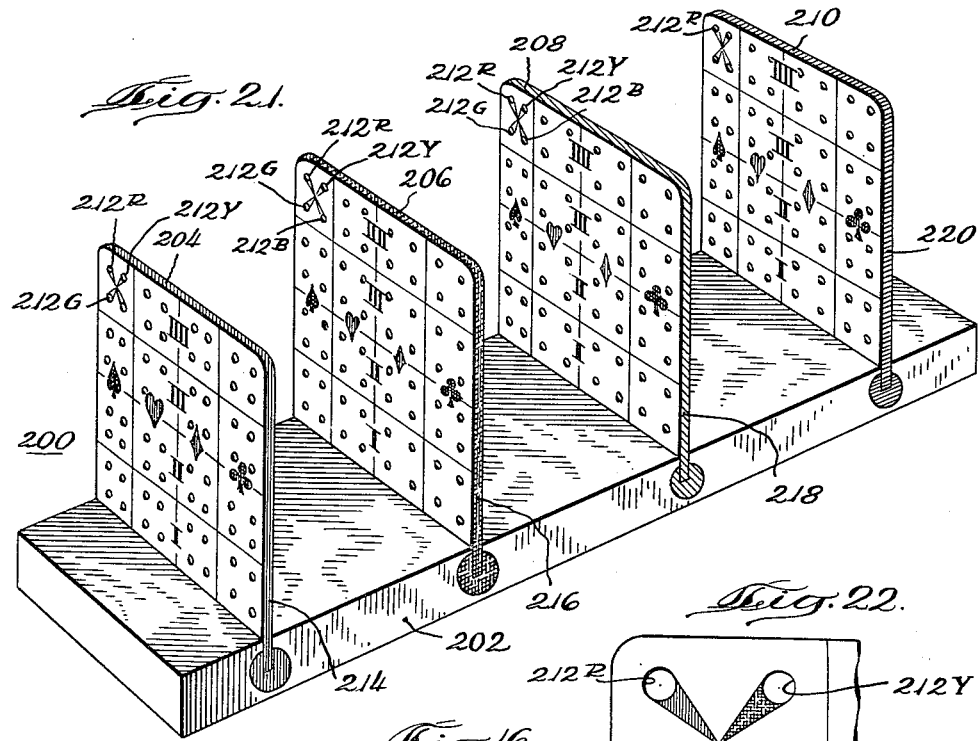
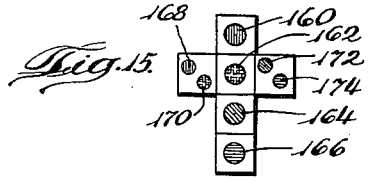 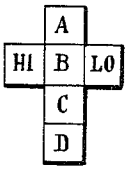 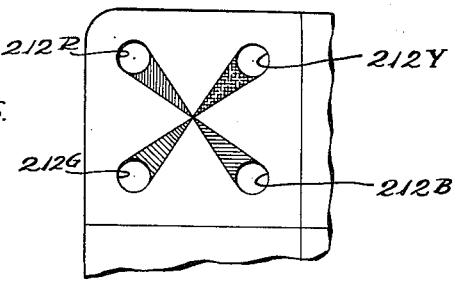
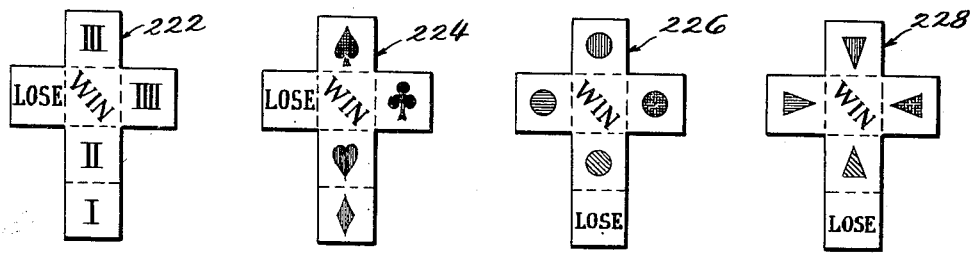
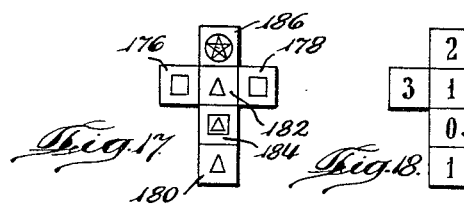
INVENTOR.
Don Cornish
BY
Hinkle, Horton, Ahlberg, Hausmann & Wupper
Attorneys United States Patent Office 3,169,769
Patented Feb. 16, 1965

3,169,769
MULTI-DIMENSIONAL GAMEBOARD
WITH CHANCE DEVICES
Don Cornish, 2540 NE. 97th St., Rochester, N.Y.
Continuation of application Ser. No. 740,377, Apr. 9,
1947. This application Feb. 11, 1952, Ser. No. 271,030
3 Claims. (Cl. 273—135)

The present invention relates to an amusement apparatus and has for its primary object the provision of a new and improved three or more (symbolic or simulated) dimensional amusement apparatus and the present application is a continuation of my copending application Serial No. 740,377 filed April 9, 1947, abandoned February 12, 1952.

A further object of the present invention is to provide a new and improved three or more (symbolic or simulated) dimensional amusement apparatus which is adapted to be played individually by two or more persons or by two or more teams each comprising at least two persons.

Another object of the present invention is to provide a new and improved three or more dimensional amusement apparatus including means for supporting game pieces in three dimensional spatial arrangement.

A still further object of the invention is to provide a three or more dimensional amusement apparatus in which certain of the playing positions have special values, or which give the player an opportunity to multiply his score by a factor determined by chance.

Another object of the present invention is to provide a new and improved amusement apparatus which can be used to play games of skill or games of luck, or games combining both skill and luck.

A further object of the present invention is to provide a new and improved amusement apparatus comprising a substantially three dimensional playing board, game pieces individual to the players or teams, and means of chance (such as one or more dice or the like) bearing appropriate symbols to indicate a particular position or group of positions into which the game pieces may be played. It is preferred that the symbols include at least three distinct sets which may be correlated with the three dimensions of the game board and that the symbols and board be so correlated as to specify the coordinates of a position or the coordinates of groups of positions. The feature of providing the devices of chance with symbols which may designate a group of positions into which a game piece may be placed, combines the elements of chance and skill.

A still further object of the invention is to provide a new and improved amusement apparatus, especially a three dimensional or symbolic or so-called four dimensional one.

Another object of the present invention is to provide a symbolic four dimensional amusement apparatus.

Another object of the present invention is the provision of a new and improved amusement apparatus having a physical structure of N dimensions and which may be used to play a game in N plus one dimensions. For example, a two dimensional structure can be used to play a symbolic three dimensional game, and a three dimensional structure can be used to play a symbolic four dimensional game.

Other objects and advantages of the present invention will become apparent from the ensuing description of an amusement apparatus constructed in accordance with the present invention, and in the course of which reference is had to the accompanying drawings, in which:

FIG. 1 is a perspective view of one embodiment of the amusement apparatus upon which one of the games is played;

FIG. 2 is an elevational view of the left one of four panels of the apparatus shown in FIG. 1, which panels are preferably detachable from an associated base;

FIG. 3 is a fragmentary side elevational view, partly broken away, of the apparatus illustrated in FIG. 1;

FIG. 4 is an elevational view of one form of game piece which may be utilized;

FIG. 5 is an elevational view of another type of game piece, which may be used if desired;

FIG. 6 is a perspective view of means of chance (a die) which is utilized in playing one form of game;

FIGS. 7, 8 and 9 are developed views of three devices of chance, i.e., three dice, constituting a means of chance utilized in playing one form of the game;

FIG. 10 is a perspective view of an alternative type of game piece;

FIG. 11 is a perspective view of still another type of game piece;

FIG. 12 is a fragmentary elevational view of a panel with which game pieces of the form shown in FIG. 11 may also be used;

FIG. 13 is a perspective view of another form of game apparatus;

FIG. 14 is a perspective view of still a further form of game apparatus;

FIGS. 15, 16, 17, and 18 are developed views of dice which may be used with the game apparatus shown in FIG. 14;

FIGS. 19 and 20 are enlarged perspective views of game pieces which may be used with the game apparatus illustrated in FIG. 14;

FIG. 21 is a perspective view of a symbolic four dimensional game apparatus;

FIG. 22 is a fragmentary enlarged view of a portion of the game apparatus shown in FIG. 21; and FIGS. 23, 24, 25 and 26 are developed views of dice which may be used with the game apparatus shown in FIG. 21. Of these FIGS. 23, 24 and 25 correspond to FIGS. 7, 8 and 9 but have been shown here to facilitate following the description.

Referring now to the drawings and first to FIGS. 1, 2, and 3, it may be noted that the game board of the present invention, which is indicated as a whole by reference character 10, comprises a base 12 and a plurality of panels 14, 16, 18 and 20, constructed and arranged so as to provide playing positions as well as groups of playing positions disposed in systematic plural (three) dimensional array, as will be described in greater detail hereinafter.

The base 12 is preferably made of some suitable material, such as wood. It is generally rectangular or block-like in shape and has a series of spaced apart transverse grooves 22 or other appropriate means for detachably receiving the previously referred to panels.

The panels are preferably rectangular in shape and, as already indicated, they are adapted to be detachably mounted in spaced apart relation upon the base. They are provided with means for supporting or receiving and firmly holding the game pieces, which means preferably consists of a plurality of holes or apertures 24. The apertures in the various panels shown in FIG. 1 are thus located in parallel vertical planes. They are also located in horizontal rows and vertical columns in each of the panels, and all the panels of FIG. 1 are identical with the result that the apertures are so located that each one lies on a line passing through it and through three other apertures located either in the same or in different panels. In other words, a line can be passed through four openings or playing positions and the line can be either horizontal, vertical or diagonal and either in one panel or extending through a plurality of panels.

While the specifically illustrated arrangement is such that the lines are straight, it should be understood that the lines need not be straight. It is preferred, however, that the positions be on mathematically simple and regular lines.

Symbols or indicia are provided for locating each aperture or playing position. The symbols may be of various kinds, but for the illustrated construction, a system of three dimensional Cartesian coordinates has been found convenient. The panels are individually indicated as by color symbols; the panel 14 being indicated preferably by a red symbol 26 disposed at the end of the groove 22 and by a red border 28 around the visible portion of the panel; panel 16 being similarly indicated by a yellow circle or symbol 30 and a yellow border 32; panel 18 by a green circle or symbol 34 and a green border 36; and panel 20 by a blue circle or symbol 38 and blue border 40.

The playing positions in FIG. 1 in the parallel vertical planes which are at right angles to the panels are indicated by other symbols or indicia, such as the well known playing card indicia. Thus the two outside such planes of positions as shown in FIG. 1, any such planes being hereinafter referred to as sections, are indicated by the "spade" and "club" symbols 42 and 44, while the two inside sections are indicated by the "heart" and "diamond" symbols 46 and 48. If desired, these symbols could be placed on the panels so that, if the colored circles on the base were also omitted, the base would not have any symbols on it.

The horizontal planes of playing positions of FIG. 1, which will hereinafter be referred to as floors, are indicated by other symbols, such as the Roman numerals I, II, III, and IIII, respectively, which are preferably applied in vertical ascending order on each of the panels. The coloring of the numerals may be selected to correspond with the coloring of the circular symbols and borders associated with the respective panels, thereby to provide an additional indication of the particular panel.

In order that the game pieces, which are illustrated in FIGS. 4, 5, 10 and 11, may be readily seen by all players, it is preferred that the panels be made of some clear material such as glass or transparent plastic; or alternatively an opaque construction material could be made effectively transparent by incorporating a sufficient number of holes in it, as for example, window screens.

Different types of games may be played with the game board described above. In one type of game, game pieces or men of the character illustrated in FIG. 4 may be utilized. In this figure, a single game piece 43 has been illustrated. It is, in accordance with one of the features of the present invention constructed from some material which is readily and substantially deformable by small forces or pressures, such as an elastomer. It is also preferably constructed in the form of a tube having a tapered and pointed end 45 to facilitate its placement into a playing position. The outside diameter of the game piece is slightly greater than the diameter of an aperture 24 so that when the game piece is inserted into the aperture, the resulting stresses serve to hold it securely.

A modified form of game piece is illustrated in FIG. 10. Here, the game piece 70 is illustrated as comprising three longitudinal fins extending radially out from a central region. A game piece with flexible fins of this character possesses somewhat more resilience than the previously described game piece. If desired, the central portion of the game piece may be relatively rigid.

A still different type of game piece is indicated by the reference character 72 in FIG. 11. Here, the game piece is illustrated as a substantially flat rectangular element or token. It is made of some material such as cardboard. Game pieces of this type may be used with panels of which a fragment is illustrated in FIG. 12. In this figure, the panel is designated by the reference character 74 and it has a plurality of permanent inserts 76 which contain long slot-like apertures as at 78 for the reception of the tokens. The slots are somewhat smaller in size than the tokens so that the tokens, when inserted in place, are held mainly by the resiliency of the elastomer inserts. If desired, the tokens may be slightly tapered at their ends to facilitate insertions. The inserts are mounted in suitable apertures 80 in the panel and these apertures 80 are located so that the slots 78 are arranged in a substantially three dimensional array in the manner of the apertures 24 in the previously described panels. It should be noted that the token could be an elastomer and the slot be defined by a substantially rigid material.

In playing a game with game pieces of the character illustrated in FIGS. 4, 5, 10 or 11, means of chance, which may be constructed by a plurality of devices of chance, such as the dice 50, 52 and 54 may be utilized. The dice are provided with symbols corresponding to those on the previously described game board. When the dice are thrown, they indicate either the particular playing position in which a game piece is to be placed, or they indicate the group of positions in one position of which the player may place the game piece, according to his own desire. Accordingly, it is seen that in a game of this character, the elements of chance and skill are combined.

One of the dice, such as the die 50, has upon it symbols corresponding to the panels, i.e., it has upon it red, yellow, green, and blue symbols 26A, 30A, 34A, and 38A, respectively. When the dice are thrown and one of the colored symbols turns up, it indicates the particular panel into which the game piece must be placed. A second of the dice may determin the horizontal row or floor into which the game piece must be placed. This is the die 52 which has upon four of its sides the Roman numeral I to IIII corresponding to the floors on each of the panels. The third die carries the card suit symbols corresponding to the sections, these symbols being indicated by the reference characters 42A, 44A, 46A, and 48A.

Accordingly, when the dice are thrown, the symbols determine the one or more playing positions into which the game piece may be placed. Thus, when a red circle, a numeral I, and a "club" suit are all three shown by the dice, they define the position at the lower right hand corner of panel 14 of FIG. 1.

It is preferred also that the dice have more faces than the total number of panels, floors and sections so that the players may have some choice of playing positions. If the dice indicate one or more playing positions, none of which is vacant, then the player loses his turn. Accordingly, each of the dice may be provided with additional symbols which differ from the color and numeral and suit symbols discussed above, such as the symbols "Win" and "Lose." If one of these turns up, along with say the symbol for a particular panel and particular floor, then the player can choose any one of the four playing positions which is on both the indicated panel and the indicated floor. If two of the symbols "Win" or "Lose" turn up, say along with that for a particular floor, then the player can place his game piece in any one of the sixteen positions on that floor. Also, if all three "Wins" turn up, then the player throwing them wins the game; and if all three "Loses" turn up, then the player loses the game if there are only two players or teams, otherwise the three "Loses" requires the player or his team to withdraw from that game.

In the game which may be played with the apparatus as described above, the dice determine either the particular position or group of positions into which the game pieces 43 may be placed or they may signify some other possible alternative as noted above for three "Wins." The game may be played by two or more individuals or by teams, each composed of two or more individuals. The game pieces 43 are differently colored to distinguish the game pieces of each player or team, the same colored game pieces being used by all players on the same team.

In the following description of the playing of a game, it is contemplated that two persons will be playing. The first player throws the dice and, it will be assumed that the dice turn up with a colored circle, a Roman numeral and a card suit. The colored circle determines the particular panel into which the game piece is to be placed and the Roman numeral and card suit determine the respective floor and section. Thus, whenever the three coordinate symbols of color, numeral and suit are thrown, the dice determine the specific playing position into which the game piece is to be placed. The players take turns throwing the dice and place the game pieces into the positions indicated by the dice. The first player to place four of his game pieces in a single straight line wins the game. This straight line, it may be noted, can be either horizontal, vertical, or diagonal in one panel; or horizontal and either parallel to or diagonal with respect to the length of the board; or oblique to the vertical and either parallel or diagonal with respect to the length of the board.

If a color for the panel and a card suit for the section are thrown along with either a "Win" or a "Lose," then the player may choose any floor, but he must place the game piece in a playing position which is in both the indicated panel and indicated section; if a color and numeral are thrown with a "Win" or a "Lose," then the player may choose any section, but he must place the game piece in a position which is common to the indicated panel and indicated floor; and if a card suit and numeral are thrown with a "Win" or a "Lose," then the player must place the game piece in the indicated floor and indicated section, but he may choose any panel he desires. In other words, when two of the coordinate symbols are thrown along with either a "Win" or "Lose," the "Win" or "Lose" may be considered to be a "wild" symbol, thus permitting the player to choose any panel or floor or section not specifically indicated by the dice.

Another type of game including two different types of game pieces may be played. This game can be played with game pieces of the character of game piece 43 and other game pieces indicated by the reference character 60 illustrated in FIG. 5. These game pieces are also constructed of elastomer and have pointed ends 62 to facilitate their insertion into the openings 24 in the panels. However, they are preferably somewhat longer than the game pieces 43 and have colored bands 64 or other symbolic means whereby they may be easily distinguished from the game pieces 43.

Each player has both types of game pieces and both of his types are of the same color, except, of course, for the colored bands.

In playing the second type of game, it is played like the previously described one until a player gets four of his game pieces in a line. Each time a player completes a line composed of four game pieces of either or both types, he records his score, which score may be determined in a manner hereinafter to be described. Upon completing a line, he removes all the game pieces 43 in the line and places a game piece 60, which may be a game piece of superior value, in any desired one of the apertures in the line from which the game pieces 43 have just been removed. Once a game piece 60 is positioned in a panel, it cannot be removed during the remainder of the game.

The player completing a line of game pieces is also allowed another turn with the dice, with the result that he is able to place another game piece 43 on the game board, as indicated by the dice. It is thus possible for a player to achieve several lines of game pieces in rapid succession before he plays out the free turns that are allowed him. In some respects this is similar to a player's jumping several men in succession in a game of "Checkers." The game is completed whenever one player gets all of his game pieces 60, of which there may be ten, on the game board, or when one player gets four of the game pieces 60 in a line, or when one player reaches a predetermined score.

The scoring may follow any of several methods. For one manner of scoring, one point may be granted for a line of four game pieces which is either vertical or is horizontal and parallel to an edge or side of the base 12; twelve points may be granted for a line of four game pieces which extends diagonally to the length of the board from one corner of panel 14 to the diagonally opposite corner of panel 20; and two points may be granted for any other type of line.

Other types of games may be played with the game as described above. For instance, a game including the various features of that last described, providing for the counting of different types of lines of game pieces can be played without the use of dice, the players taking turns in placing their game pieces in vacant positions freely selected by each player.

If games which utilize game pieces 60 as described above are to be played, then a bonus of five points may be given to a player who obtains a line of four of the superior game pieces 60.

It is contemplated that other methods of scoring can be used, and also that a score can be given for more than four game pieces in a line, if the number or arrangement of playing positions on the game board is so changed as to make such lines possible.

A further embodiment of the invention is illustrated in FIG. 13 to which reference is now had. This embodiment illustrates the application of certain principles of the present invention to a game in which each of the players has a game board like the one illustrated in FIG. 13 but having different arrangements of symbols thereon.

The game board illustrated in FIG. 13 is indicated as a whole by reference character 100. It includes a base 102 and a plurality of panels 104, 106 and 108 similar in many respects to the panels 14 to 20 of the previously described embodiment and which are adapted to be secured in vertical spaced apart relation upon the base board.

The panels are individually designated by suitable symbols, such as the red, yellow and blue borders 110, 112 and 114, respectively, as well as by the red, yellow and blue circles 116, 118 and 120, also respectively, on the base.

Each of the playing positions is defined by the holes or apertures 122 preferably located as in the previously described embodiment of the invention in horizontal floors and vertical sections, there being three apertures or playing positions in each of the panels in each of the floors and sections. All the panels are identical with the result that the playing positions are so located that each one lies on a line passing through it and two other apertures located either in the same or in different panels. In other words, a line can be passed through three openings or playing positions and the line can be either horizontal, vertical, or diagonal and either in one panel or extending through a plurality of panels.

Symbols and indicia are provided for distinguishing each playing position. As before, the symbols may be of various types but for simplicity they have been indicated by numbers and it is preferred that the number be chosen at random. The number of symbols may be equal to or greater than the number of playing positions on a single board—preferably greater, but it is possible to use fewer symbols than playing positions if symbols are duplicated on a given board. In order to facilitate play, the numbers on each of the panels are tabulated upon tabs 124, 126 and 128 at the upper edges of the three panels. Thus, the tab on panel 104 contains the numbers 1, 6, 7, 8, 11, 13, 15, 22 and 27 appearing on that panel. The tabulation is preferably in numerical order so that the player may more readily find the number.

As already indicated, each of the players has a board but the panels for each board contain different symbols. In playing the game each player has a desired number of game pieces, which are preferably of different value, e.g., three yellow, four blue, and as many red ones as may be required or desired. In playing this embodiment of the game the playing positions in which the players may place a game piece are determined by means of chance, which, in this case, may be a spinning arrow indicator or cards or other means of randomly selecting one member of a class from other members of the class. An umpire or referee may operate the means of chance. Each time a number is selected it is called out. If it is on a player's board, he puts a red, blue or yellow game piece in the playing position indicated by the number. The aim is to place the game pieces in lines including three playing positions either in any one or on all three of the panels. The first player to get three game pieces in a line is the winner. The use of different colored and valued game pieces gives the players a chance to obtain higher scores if they can place three blue game pieces in a line or a still higher score in the event the three yellow game pieces are placed in line. Once the yellow or blue game pieces have been played in any position, they cannot be moved therefrom and in order to avoid the possibility of the players moving them during play, the umpire should record the number of the position, as on a pad. Alternatively, the players can record their plays of the yellow and blue game pieces. Added interest is given to the game if the player is given the right to refrain from saying he has finished the game for a low value (red) three in line, but he thereby forfeits any right to claim a win by that line as a result of his election.

The game pieces may be like the game pieces 43 of FIG. 4 or 70 of FIG 10 or of any other desirable form.

Another and further embodiment of the invention is illustrated in FIGS. 14 to 20. This embodiment is in some respects similar to the first described embodiment, but the playing positions are grouped differently, certain of the positions are given special values, and some of the game pieces have their value concealed at least from the player's opponents. Also, the playing position defining structure and game pieces are of a different construction.

Referring first to FIG. 14, it may be seen that the game board which is indicated as a whole by reference character 130, includes a base 132 and four transparent panels 134, 136, 138, and 140 mounted in vertical spaced apart relation upon the base. The individual panels are designated as heretofore by color symbols, the panels 134 to 140 being provided with red, yellow, green, and blue borders 142, 144, 146, and 148, respectively, and having correspondingly colored circles 150, 152, 154, and 156 associated with them.

Each of the panels has four horizontal floors and four vertical sections of four playing positions each. The playing positions are defined by generally arcuate apertures 158 and all of the panels are identical so that each playing position is included in a plurality of lines of four playing positions, which lines may be in either the same or different panels.

The playing positions are divided into a plurality of groups, preferably of four playing positions in each of the four panels, so that each group includes sixteen playing positions. These groups are indicated by the letters A, B, C, and D, and it is preferred that each letter indicate the four playing positions in one of the four quadrants into which each panel can be divided.

The playing positions are also divided into another series of groups which are designated by symbols and which grouping is based upon the type of location of the playing positions in the three dimensional array. The corner playing positions in the two end panels, which may be termed vertex positions, are indicated by a "star" symbol. The inner playing positions, i.e., the four inner playing positions in each of the two middle panels, are indicated by the symbol O. There are thus eight each of the vertex and inner playing positions. A series of edge positions, of which there are twenty-four, are indicated by triangles. An equal number of face positions are indicated by squares. A greater number of lines can be passed through the vertex and inner positions than through the edge and face positions, it being possible to draw seven lines through the vertex and inner positions and only four through each of the edge and face positions.

The game board illustrated in FIG. 14 may be used with chance means, such as a plurality of dice, constructed to provide an indication of the particular position into which a game piece is to be placed or giving the player some latitude as to which of a group of positions he can place a game piece in. Three dice of the character which can be used with the board are illustrated in FIGS. 15, 16 and 17, to which reference is now had. The dice are illustrated as being, but need not be, six sided. One of the dice, that shown in FIG. 15, is marked with symbols corresponding to the four panels, i.e., with colors corresponding thereto. It is preferred that the die illustrated include on four of its faces the colored circles 160, 162, 164, and 166, colored red, yellow, green, and blue, respectively. It is also preferred that the other faces of the die be marked with two colors to give the player a choice between two panels. Thus, the red and yellow circles 168 and 170 appear on one face, and the green and blue circles 172 and 174 on another face.

A second die, the one illustrated in FIG. 16, is marked with indicia corresponding to the symbols of the groups of positions A, B, C, and D. Thus, four faces are marked with the letters A, B, C, and D, while the two remaining faces are marked "HI" and "LO." The "HI" symbol indicates that the game piece can be placed in either of the upper groups A or B and the "LO" symbol indicates that the game piece can be placed in either of the lower groups C and D.

The third die is marked with symbols corresponding to the types of playing positions. It is preferred that two of the faces 176 and 178 be marked with the square face symbol and two others 180 and 182 be marked with the triangular edge symbol. Another face 184 is marked with both the edge and face symbols, while the last face 186 is marked with both the vertex and inner position symbols. The reason for having but a single vertex and inner position symbol and placing them on the same face is that there are fewer of these types of positions than others.

The particular arrangement of symbols on the dice may be varied to vary the odds that a certain preselected position will be indicated when all three dice are thrown. In the indicated arrangement, there is one chance in eighteen of placing a game piece in a particular edge position or a particular face position and one chance in fifty-four of placing a game piece in an inner or a vertex position. One way of varying the odds is to use a regular octahedron in place of the die of FIG. 17. This octahedron would have single vertex and central symbols and three edge and face symbols, all symbols being on an individual face. Other ways of changing the odds can be used.

In the embodiment of the invention illustrated, certain of the playing positions have a special significance or value. One way of giving a position this special value is to multiply the value of the game piece in that position by a certain factor. Alternatively, the special positions, such as those marked by the lower case letters *a* to *h*, inclusive, give the player placing a game piece thereon the opportunity of multiplying his line score by a certain value assigned to the special position or by the use of a die 190 shown in FIG. 18. This die includes several multiplier factors, as clearly indicated thereon, by which the point score of a line would be multiplied.

In accordance with another feature, the game pieces themselves have different values and it is preferred also that the values of certain of the game pieces be placed so as to be hidden from the player's opponent. The game piece 192 of FIG. 20 is one having a fixed unit value which may or may not be indicated thereon, and which is indicated as being one. The game piece 194 in FIG. 19 is indicated as having a value of 50. The construction of the game pieces is such that the values may be hidden from the player's opponents. One suitable way of providing this desired result is to have them of folded construction whereby each includes the parts 1 and 2.

Each of the players will have game pieces of a distinctive color. Each will also have a suitable number of game pieces of unit value, such for example as sixteen. Each will have, say, sixteen game pieces of different and higher values.

In playing a game with the game apparatus illustrated in FIGS. 14 to 20, inclusive, the players will alternately throw the dice and the latter will indicate the particular position or groups of positions into which the player may place a game piece. While the rules may be varied, it is contemplated that each player will use his two types of game pieces alternately. When a player places four of his game pieces in a line, the fourth or last piece in that line must be of the lowest value that the player has unless all three others can be shown to be of the lowest value. The four game pieces in the line are removed and the values are totalized. Should one of the game pieces be in a special position, such as position $a$, the total of the line may be multiplied by a factor given to the position $a$ or the multiplier die 190 can be thrown to supply a factor by which the line point total may be multiplied. The game may continue until one of the players reaches a predetermined total.

The game apparatus of FIGS. 14, 19 and 20 may also be used without the dice in which event the players alternately place their game pieces in game positions selected by them.

Many of the foregoing principles of the present invention are applicable also to a novel symbolic, simulated or so-called four dimensional amusement device which is illustrated in FIGS. 21 to 26, inclusive, to which reference is now had. Referring first to FIG. 21, it may be noted that the same board, which is indicated as a whole, by reference character 200, comprises a base 202 and a plurality of panels 204, 206, 208 and 210 constructed somewhat like the previously described panels except that each is provided with additional playing positions making the device effectively a four-dimensional one.

The panels are illustrated as being rectangular in shape and are mounted in spaced apart relation upon the base. They are provided with playing positions which are effectively in symbolic four dimensional array (circle color, numeral, card suit, pennant color) although, physically, the arrangement is three dimensional (length, width and depth extension). The playing positions are defined or constituted by holes or apertures 212. However, there are four playing positions in place of each one of the playing positions of the previously described embodiment. These four playing positions are indicated by the reference characters 212R, 212Y, 212G, and 212B, the letters standing for the colors red, yellow, green, and blue, respectively. There are four horizontal floors and four vertical sections of cells, each of which contains a cluster of four playing positions and all of the panels are alike.

Symbols or indicia are provided for locating each playing position. As illustrated, the four horizontal floors on each of the panels are illustrated by the Roman numerals I, II, III, and IIII; the vertical sections on each of the panels are indicated by the card suits; the four panels are indicated by the red, yellow, green, and blue borders 214, 216, 218 and 220, respectively; and the four playing positions of the individual cluster of four are indicated, as best illustrated in FIG. 22, by the red, yellow, green, and blue pennants R, Y, G and B.

A symbolic four dimensional nature of the game board will become more apparent from the following description of a game which can be played thereon. However, it may be briefly stated here that each cluster of four playing positions and, hence, each cell is located in three dimensional array just as the individual playing positions of the previously described embodiments and that the symbolic fourth dimension is provided by the four individual playing positions 212R, Y, G and B in each cell. In playing the game, the aim is to place four game pieces in line, not only as in the earlier embodiments, but also according to the locations or color of the playing positions 212R, Y, G, or B. For example, a line is completed when game pieces are placed in the four positions 212R in the upper left hand corners of the four panels. A row of playing positions which extends into all of the dimensions of the game board may be called a "quadragonal," as is exemplified by the four colinear positions whose coordinates are as follows: (spade, IIII red circle, red pennant), (heart, III, yellow circle, yellow pennant), (diamond, II, blue circle, blue pennant), (club, I, green circle, green pennant). There are eight such "quadragonals" on each dimensional board such as that illustrated in FIG. 21.

The symbolic four dimensional game of the present invention may be played with or without the use of means of chance. If it is desired to use means of chance, dice having the symbols illustrated in FIGS. 23 to 26 may be used. The die 222 in FIG. 23 includes the Roman numeral symbols I, II, III and IIII, plus the "Lose" and "Win" symbols; the die 224 illustrated in FIG. 24 includes the card suit symbols and the "Lose" and "Win" symbols; the die 226 in FIG. 25 includes the red, yellow, blue and green circles corresponding to the four panels; and the die 228 in FIG. 26 includes the red, yellow, green and blue pennants as well as the "Lose" and "Win" symbols.

The game may be played with the dice in the same manner as the first described embodiment of FIGS. 1 to 9, inclusive. If the four dice each turn up with a game symbol, then the particular playing position into which the game piece must be placed is thereby determined. If a lesser number of game symbols is thrown, then the player is given a choice as to where the game piece can be placed, as earlier described. The game pieces likewise may be of different forms such as any of those described heretofore.

It should be mentioned that the symbolic four dimensional game includes a feature which might be called extending a particular physical dimensional apparatus by one symbolic dimension. To illustrate, symbolic four dimensional apparatus is achieved by extending a three dimensional physical apparatus by one dimension. In like manner, a two dimensional apparatus can be extended into a three dimensional apparatus and this is actually accomplished in each of the individual panels wherein a group of four playing positions is substituted for each single playing position. In other words, each panel is the full equivalent of a three dimensional array of playing positions, with their appropriate symbols.

From the foregoing detailed description of the present invention, it may be noted that it contains certain basic principles, some of which are utilizable generally in multi-dimensional amusement devices, and that it also includes other principles which are applicable to three or symbolically more dimensional amusement devices. Also, while the invention has been described in connection with the details of specific embodiments thereof, it should be understood that these details are not intended to be limitative of the invention except insofar as set forth in the accompanying claims.

What I claim as new and desire to secure by Letters Patent of the United States is:

1. Amusement apparatus for play with game pieces comprising a three dimensional structure including four spaced apart aligned transparent panels each having four horizontal rows or floors and four vertical columns or sections of playing positions, distinctive symbols for indicating each of said panels, the aligned floors and the aligned sections, and three devices of chance for indicating positions in which game pieces are to be played and of which one has symbols corresponding to said panels, a second has symbols corresponding to said floors and the third has symbols corresponding to said sections.

2. Amusement apparatus as claimed in claim 1, wherein said devices of chance are dice and each of the dice has another symbol thereon.

3. Amusement apparatus as claimed in claim 1, wherein said devices of chance are dice and each of the dice has two other symbols thereon.

References Cited in the file of this patent

UNITED STATES PATENTS

| | | |
|---|---|---|
| 715,474 | Gaylor | Dec. 9, 1902 |
| 1,102,594 | Kiefer | July 7, 1914 |
| 1,141,909 | D'Autremont | June 1, 1915 |
| 1,196,748 | Smith | Aug. 29, 1916 |
| 1,421,570 | Rod | July 4, 1922 |
| 1,421,656 | Abele | July 4, 1922 |
| 1,564,746 | Barnard | Dec. 8, 1925 |
| 1,655,380 | Parker | Jan. 3, 1928 |
| 1,932,524 | Jackson | Oct. 31, 1933 |
| 1,942,291 | Jefferson | Jan. 2, 1934 |
| 2,100,421 | Wupper | Nov. 30, 1937 |
| 2,239,779 | Clark | Apr. 29, 1941 |
| 2,313,473 | Heacock | Mar. 9, 1943 |
| 2,368,896 | Stewart | Feb. 6, 1945 |
| 2,453,907 | Hare | Nov. 16, 1948 |

FOREIGN PATENTS

| | | |
|---|---|---|
| 25,518 | Great Britain | 1905 |
| 601,062 | Great Britain | Apr. 27, 1948 |